United States Patent [19]

Weinberg

[11] 4,416,511

[45] Nov. 22, 1983

[54] PROJECTION SCREEN ARRANGEMENT

[75] Inventor: Ulli Weinberg, Roth, Fed. Rep. of Germany

[73] Assignee: Reflecta GmbH Foto Film Projektion, Schwabach, Fed. Rep. of Germany

[21] Appl. No.: 358,182

[22] Filed: Mar. 15, 1982

[30] Foreign Application Priority Data

Apr. 15, 1981 [DE] Fed. Rep. of Germany ....... 3115177

[51] Int. Cl.³ ............................................. G03B 21/56
[52] U.S. Cl. .................................... 350/117; 160/24; 160/238; 160/328
[58] Field of Search .................. 350/117; 160/238, 24, 160/328

[56] References Cited

U.S. PATENT DOCUMENTS

| | | | |
|---|---|---|---|
| 3,942,868 | 3/1976 | Hoffbauer et al. | 350/117 |
| 4,060,310 | 11/1977 | Brown | 350/117 |
| 4,072,404 | 2/1978 | Brown | 350/117 |
| 4,159,162 | 6/1979 | Christoffell | 350/117 |
| 4,312,568 | 1/1982 | Weinberg | 350/117 |

FOREIGN PATENT DOCUMENTS

| | | | |
|---|---|---|---|
| 260191 | 1/1964 | Australia | 350/117 |
| 2345281 | 3/1975 | Fed. Rep. of Germany | 350/117 |
| 2716349 | 10/1978 | Fed. Rep. of Germany | 350/117 |
| 2752832 | 5/1979 | Fed. Rep. of Germany | 350/117 |
| 584786 | 11/1958 | Italy | 350/117 |

*Primary Examiner*—Richard A. Wintercorn

[57] ABSTRACT

A projection screen arrangement has a housing mounting a rotary roller for winding in and unwinding a projection screen. A rotary knob which is actuable from the outside of the housing is non-rotatably connected to the roller for tensioning the projection screen in the extended position, while a terminal bar member is provided at the end of the projection screen remote from the roller. A push member is mounted for radial movement in the housing and is adapted to be actuated against a spring loading by the terminal bar member when the projection screen is fully wound into the housing. The push member displaces a detent member which co-operates with a further detent means which is non-rotatable with respect to the rotary knob, for locking the roller in the winding-in direction, whereby the winding of the projection screen on the roller in the fully wound-in condition can be slackened, without the spring loading the roller in the winding-in direction re-tightening the projection screen wound on the roller.

7 Claims, 6 Drawing Figures

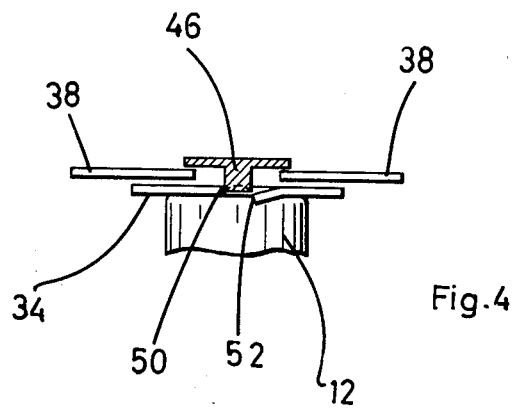
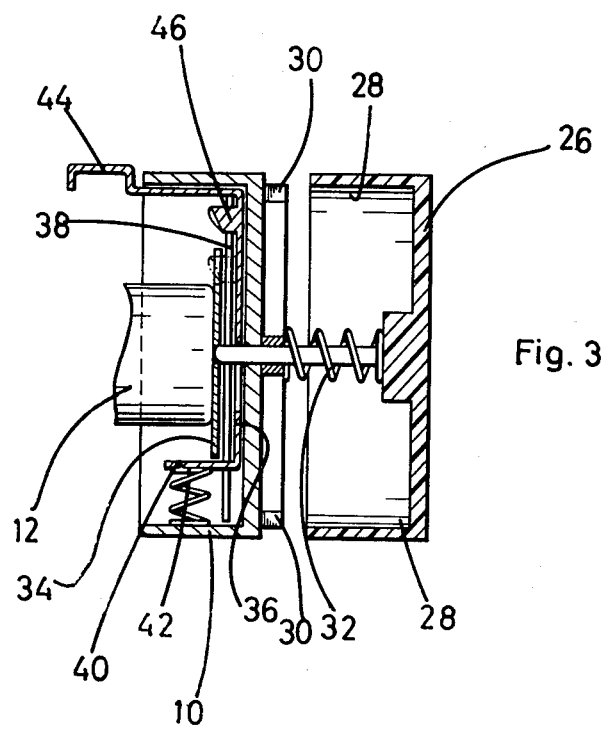

PROJECTION SCREEN ARRANGEMENT

BACKGROUND OF THE INVENTION

The invention relates generally to a projection screen arrangement.

One form of projection screen arrangement comprises a tubular housing in which there is mounted a spring-loaded roller, for winding in and winding out the projection screen. A rotary handle or knob which can be actuated from the outside of the housing is provided at one end thereof, and is nonrotatably connected to the roller for tensioning the projection screen when in the extended position. The end of thwe projection screen which is remote from the roller usually has a terminal bar member. As the force of the spring for winding in the projection screen so as to retract it automatically into the housing is generally not sufficient to hold the projection screen absolutely flat and taut when in the extended condition, the rotary knob is used for subsequently tensioning the projection screen in the extended position, by manual rotation of the knob.

It has been found that projection screen arrangements with automatic winding-in means of the above-indicated general kind suffer from the disadvantage that, in their wound-in or rolled-up condition, the location at which the projection screen member is secured to the winding-in roller, usually by the end portion of the screen member being engaged into the roller, causes pressure to be applied to the layers of the screen which are disposed thereabove around the winding-in roller, due to the force applied by the spring means loading the roller into the retracted condition of the screen member, and such pressure results in transverse strips or stripe markings being formed on the screen when in the extended condition. It will be appreciated that such markings interfere and detrimentally affect the quality of reproduction of an image on the screen

SUMMARY OF THE INVENTION

An object of the present invention is to overcome the disadvantages of the prior arrangements.

Another object of the present invention is to provide a projection screen arrangement which permits the tension applied to the projection screen to be reduced in the woundin condition thereof.

Still another object of the present invention is to provide a projection screen arrangement which permits the projection screen member to be stored in its housing under less stressful conditions.

Yet another object of the present invention is to provide a projection screen arrangement having positively interengageable and automatically operative detent means in the housing, for holding the winding-in roller in a position in which the stress applied to the projection screen member by the spring loading means is relieved.

These and other objects are achieved in a projection screen arrangement comprising a tubular housing accommodating a winding roller which carries the projection screen member itself. The roller is subjected to a spring loading for automatically winding in or rolling up the screen, for example for storage thereof. Fixedly connected to the roller at one end thereof, on the outside of the housing, is a rotary handle or knob which can be used to turn the roller for tensioning the projection screen when in its extended position. The end of the projection screen remote from the roller has a terminal bar member. Also disposed in the housing is a push or press member which is displaceable in a direction substantially radial of the housing. When the projection screen is in the fully wound-in condition, the terminal bar member thereon bears against the push member and displaces it radially into the housing against a spring means. The arrangement also includes a detent element whih is displaceable by the push member and which can thereby be moved into a position of co-operation with a further detent member which is non-rotatably connected to the rotary knob, thereby to arrest the roller in the winding-in direction.

With the projection screen arrangement in accordance with the principles of the invention, after the projection screen has been automatically wound into the housing, the tension applied thereto by the winding-in spring means can be released by rotating the rotary knob in the opposite direction to the winding-in direction, as far as may be required. This rotary movement of the roller will thus loosen the layers of the projection screen which are wound around the roller so as to reduce the pressure applied to the projection screen layers, more particularly so that the point at which the projection screen is secured to and extends out of the roller no longer applies pressure to the layers disposed thereover. By virtue of the push or press member being actuated by the terminal bar member on the projection screen when it is wound into the wound-in condition, the roller is arrested in the winding-in direction so that, when the rotary knob is released after the tension in the wound projection screen has been released, the winding-in spring means can no longer act to pull the projection screen wound on the roller into a taut condition.

In another aspect of the present invention, the rotary knob of the projection screen arrangement may be rigidly connected to a flange which is disposed within the housing. The rotary knob may also be axially displaceable relative to the housing and may be adapted to be locked to the housing, to prevent rotary movement of the knob, by way of axially interengageable locking members provided on the housing and on the rotary knob respectively. A spring may be provided to urge the rotary knob away from the end of the housing and thus out of locking interengagement therewith. The detent member which is actuable by the push or press member may be a detent projection which is disposed radially outside the periphery of the flange when the push member is not actuated while, when the push member is actuated and thus displaced radially inwardly, the detent projection is disposed radially inwardly of the outside periphery of the flange. The second detent member which co-operates with the detent projection may be a radial recess or opening in the periphery of the flange, for receiving the detent projection when the winding-in roller is to be locked in the housing. When the rotary knob is in the position of not being pushed axially towads the housing, the radial opening or recess in the flange will be in the radial line of movement of the detent projection. The detent projection and/or the flange is or are radially bevelled or inclined, to permit relaive passing movement of the detent projection on the outside of the flange, which is remote from the winding-in roller, when the push member is actuated by the terminal bar member on thwe projection screen, in all those rotary positions of the flange in which the recess therein is not in the line of movement of the projection. Either the detent projection, on the side which comes to bear against one edge of the recess in the flange when unwinding the projection screen, or the edge of the recess which comes to bear against the detent projection in the unwinding operation, is bevelled or inclined in the peripheral direction, for rotary movement in the opposite direction to the winding-in direction.

In an embodiment of the construction in accordance with the present invention, the push member may be formed at one end of a slide member which is guided for radial displacement relative to the housing on the inside of the end of the housing at which the rotary knob is disposed. At the end remote from the push member, the slide member has a leg which is subjected to the force of the spring means urging the push member radially outwardly of the housing. The above-mentioned detent projection is provided on the slide member, on the same side thereof as the push member.

In order to ensure under all circumstances that the push member is adequately engaged by the terminal bar member to produce the desired locking effect in respect of the roller, it may also be advantageous for the tubular housng to have a latching means for securing the terminal bar member to the housing when the projection screen is wound into the housing.

Further objects, features and advantages of the construction according to the present invention will be set forth in the following description showing an embodiment of the construction of the present invention merely by way of illustrating example.

BRIEF DESCRIPTION OF THE DRAWINGS

FIG. 3 shows a view in longitudinal section of the projection screen arrangement in the region of the rotary knob at one end thereof, FIG. 4 shows a plan view of the detent projection and recess co-operable therewith in the flange for locking the winding-in roller in accordance with the principles of the invention.

DESCRIPTION OF THE PREFERRED EMBODIMENT

Figure 1:
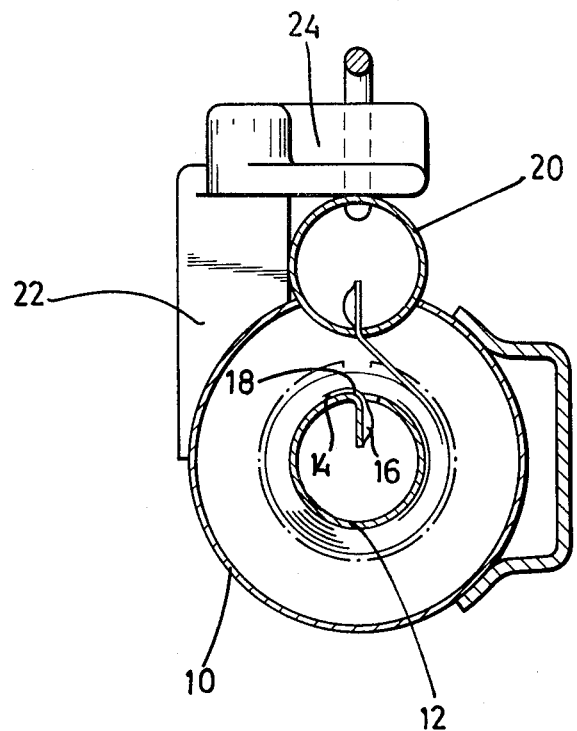
FIG. 1 is a diagrammatic view in cross-section thrugh the projection screen arrangement in accordance with thwe principles of the invention, in the rolled-up or wound-in condition.

Referring firstly to FIG. 1, a projection screen arrangement comprises a tubular casing or housing 10 in which there is mounted a winding-in roller 12 for carrying a projection screen 14. The projection screen 14 is secured to the roller 12 by an end portion thereof being engaged through a slot in the roller 12. The screen 14 is fixed in the roller 12 by means of a spring member 16. As discussed hereinbefore, in the prior projection screen arrangements, the location 18 at which the projection screen comes out of the roller wound apply pressure to the layers of screen disposed thereover.

The end of the screen 14 remote from the roller 12 is secured to a terminal bar member indicated at 20 in FIG. 1 and illustrated as being of tubular shape. When the projection screen is wound into the tubular housing 10, the terminal bar 20 rests on the housing 10 in such a way as partly to engage into the opening therein for the projection screen.

Figure 2:
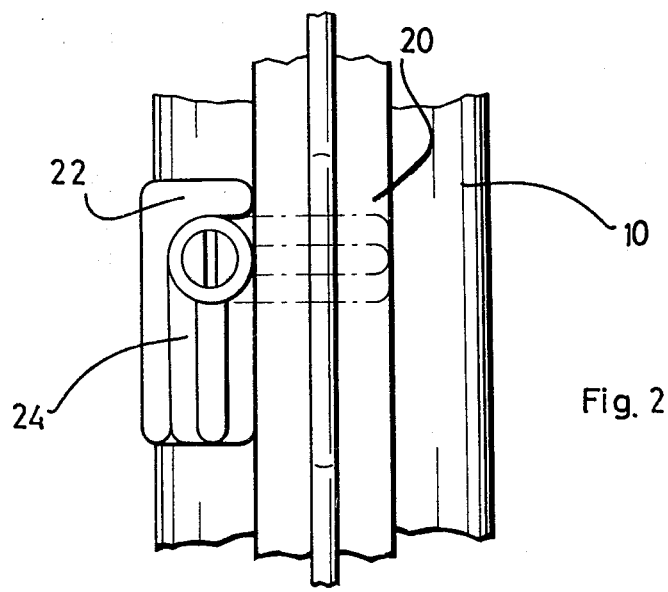
FIG. 2 shows a plan view of the projection screen arrangement shown in FIG. 1, showing the part in the region of the terminal bar member latch means.

Referring now also to FIG. 2, the projection screen arrangement illustrated has a latch or locking means comprising a holder 22 which is secured to the housing 10, and a lever 24 which is secured thereto and which can be pivoted into and out of the line of extension movement of the projection screen 14. The latch means 22 and 24 can thus be used to secure the terminal bar member 20 in its FIG. 1 position in which it is partly disposed in the opening in the tubular housing 10. FIG. 2 shows the lever 24 in solid line in the inoperative position in which the projection screen can be pulled out of the housing 10 for use thereof, while the position of the lever 24 shown in dash-dotted lines is the latching position, being the position thereof which is also illustrated in FIG. 1.

Reference is now made to FIG. 3. As will be seen therefrom, provided at one end of the tubular housing 10 is a rotary actuator or knob 26 which is non-rotatably connected to the roller 12. The rotary knob 26 is of a cup-like configuration and on the inside surface of its peripheral portion has axially extending locking members 28 which are capable of co-operating with locking members 30 disposed on the outside end surface of the housing 10. The arrangement of the locking members 28 and 30 is such that they axially interengage with clearance in the direction of rotation, when the rotary knob 26 is pressed towards the end of the housing 10 against the force of a spring 32 which urges the rotary knob 26 away from the housing 10. The members 28 and 30 lock the roller 12 in position in the housing 10, when the screen is tensioned by the rotary knob in the extended position, by a frictional lock effect. More specifically, the force urging the members 28 and 30 against each other, by virtue of the tension applied to the screen, ensures that the frictional locking action in the axial direction is sufficiently high to overcome the force applied to the rotary knob 26 by the spring 32. The frictional engagement between the members 28 and 30 therefore holds the rotary knob 26 in the position of being pessed towards the adjoining end of the tubular housing 10. The rotary knob will be released from that position, and thus displaced axially outwardly by the spring 32, if the knob 26 is rotated in the opposite direction to the direction of winding the screen into the housing 10, whereby the frictional lock between the members 28 and 30 is released. This arrangement therefore provides for the aspect of tensioning the projection screen when extended.

Figure 5:
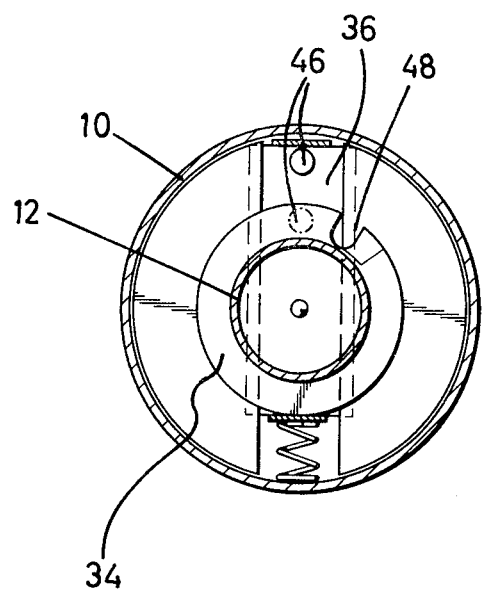
FIGS. 5 and 6 show side views of different positions of the detent projection and the recess for locking the winding-in roller in accordance with the invention.
Figure 6:
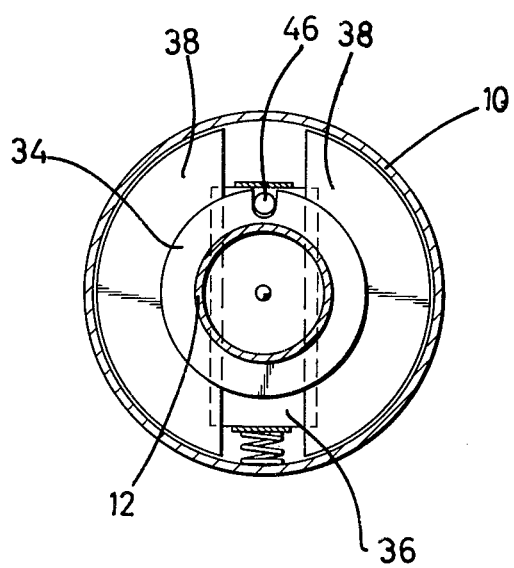

Reference will now be made to FIGS. 5 and 6 which show that the roller 12 is provided within the housing 10 with a circular flange 34, on the end of the roller 12 which is towards the rotary knob 26. The flange 34 is also visible in FIG. 3. The arrangement also includes a slide member 36 (shown also in FIG. 3) which is mounted displaceably radially in the housing 10 on the inside thereof, between the end wall of the housing 10 and the flange 34 on the roller 12. The slide member 36 is mounted for such displacement by means of two cover or mounting plates 38 which cover the edge portions of the slide member 36, as can be clearly seen from FIG. 6. To permit the shaft of the rotary knob 26 to pass through the slide member 36, the slide member 36 has a slot as can be seen from FIG. 3. At its end portions, the slide member 36 is bent inwardly relative to the housing 10, so that the end portions extened substantially parallel to the axis of the roller 12. The bent end portion which is at the lower end as viewed for example in FIG. 3 forms a leg 40 which is urged upwardly in FIG. 3 towards the flange 34 on the roller 12 by a spring 42 which, at its end remote from the leg 40, bears against the peripheral wall portion of the housing 10. The other bent end portion of the slide member 36, being the upper end as viewed for example in FIG. 3, forms a push or press member 44 which is thus urged away from the roller 12 and against the peripheral wall portion of the housing 10 by the force of the above-mentioned spring 42. The push member 44 formed by the upper bent end portion of the slide member 36 is so shaped and arranged as to project into the opening provided in the housing 10 for the screen 12 to be pulled out of and retracted into the housing 10, that opening being closed by the terminal bar member 20 in the position of the projection screen shown for example in FIG. 1. In the wound-in or rolled-up position of the projection screen as shown in FIG. 1, the terminal bar member 20 on the projection screen bears against the member 44 and thus urges it downwardly in FIG. 3, against the force of the spring 42.

In addition, in its radially extending body portion, the slide member 36 has a detent member in the form of a detent projection 46 which is disposed adjacent the end of the slide member 36 remote from the leg 40. The detent projection 46 is capable of co-operating with a radial opening or recess 48 in the flange 34, which can be best seen in FIGS. 5 and 6. When the rotary knob 26 is not axially actuated, that is to say, pushed axially inwardly towards the adjoining end of the housing 10, the flange 34 of the roller 12 is disposed in the path of radial movement of the detent projection 46. It will be appreciated that the flange 34 is connected to the rotary knob 26 by way of the shaft portion thereof, not only in regard to rotary movement but also in regard to axial movement, so that the flange is axially displaceable with the rotary knob. In order to avoid axial displacement of the entire roller 12 when the rotary knob 26 is pushed axially inwardly towards the end of the housing 10, a suitable coupling means (for example, pins or pegs in axial slots) can be provided in that arrangement.

Referring still to FIG. 3, the free end of the projection 46 is bevelled or inclined in the radial direction. When therefore the push member 44 is pushed downwardly by being engaged by the terminal bar member 20, and when the opening 48 in the flange 34 is not in line with and opposite to the projection 46, the projection 46 can nonetheless still be displaced radially downwardly in FIG. 3, by virtue of the periphery of the flange 34 sliding against the radial bevel or inclined end surface of the projection 46, whereby the flange 34, together with the rotary knob 36, is urged a little towards the left in FIG. 3. When that happens however, the locking members 28 and 30 do not come out of engagement with each other. Thus, with this arrangement, the push member 44 can be urged downwardly as viewed in FIG. 3 by the terminal bar member 20, in ay rotary position of the roller 12.

Instead of the detent projection 46 being radially bevelled as illustrated, it will be appreciated that the flange 34 could also be bent over a little towards the left in FIG. 3, at its periphery, thereby to give the same sliding co-operation between the flange 34 and the projection 46.

If now the detent projection 46 is within the periphery of the flange 34 in any rotary position of the roller 12 in which the recess 48 in the flange 34 is not in line with the detent projection 46, for example in the position shown in broken lines in FIG. 5 in respect of the projection 46, the rotary knob 26 can be rotated against the force of the screen winding-in spring (not shown), in order thereby to slacken the screen in its position of being wound around the roller 12. When that happens, the projection 46 will automatically come into engagement in the recess 48. In this arrangement, the edge 50 of recess 48 which comes to bear against the detent projection 46 when winding in the screen is of a straight configuration, as can be seen from FIG. 4. This arrangement ensures that the roller 12 is fixed in the winding-in direction so that the force of the spring loading on the roller 12 can no longer act on the projection screen when the projection screen is in the wound-in condition.

However, the wedge 52 of the recess 48 which is opposite to the above-mentioned edge 50 is bent away from the end of the housing 10 in the axial direction, so that, when the projection screen is in the wound-in position, and when the push member 44 is operatively engaged by the terminal bar member 20, the assembly can possibly be rotated through one or more turns in the direction of unwinding of the projection screen, thereby to slacken the screen on the roller.

Instead of the edge 52 being bent as illustrated in FIG. 4, the detent projection 46 can also be suitably bevelled or inclined in the peripheral direction, as indicated in FIG. 3.

It will be appreciated that the foregoing embodiments have been described by way of example only and that various modifications may be made without thereby departing from the scope and spirit of the invention.

What is claimed is:

1. A projection screen arrangement comprising a housing; a roller rotatably disposed in the housing and carrying a projection screen extendible from and retractible into the housing by being unwound from and wound on to the roller; spring means loading the roller in the winding-in direction; at one end of the housing, a rotary actuating member which is non-rotatably connected to the roller and which is actuable from the outside of the housing for tensioning the screen when in the extended position; a terminal bar member at the end of the screen remote from the roller; a push member radially displaceably mounted in the housing and adapted to be engaged by the terminal bar member when the projection screen is in the fully wound-in condition; spring means urging the push member away from its actuated position; a detent member which is displaceable by the push member; and a detent means which is non-rotatably connected to the rotary actuating member and co-operable with the detent member when the push member is actuated, thereby to arrest the roller in the winding-in direction.

2. A projection screen arrangement as set forth in claim 1 wherein said rotary actuating member is rigidly connected to a flange disposed within the housing, is axially displaceable and is adapted to be locked to the housing in the direction of rotary movement by way of axially interengaging locking means, and wherein the rotary actuating member is urged out of a condition of interengagement between said locking means by a spring.

3. A projection screen arrangement as set forth in claim 2 wherein said detent member is a detent projection which is disposed radially outwardly of the periphery of said flange when the push member is in an unactuated condition and radially inwardly of said periphery when the push member is in an actuated condition, wherein the detent means comprises a radial aperture at the periphery of the flange, for receiving the detent member, said flange being disposed in the line of radial movement of the detent projection when the rotary actuating member is in the non-locked position thereof, wherein one of the detent projection and the flange has radial included means for the detent projection to move past on the side of the flange which is remote from the roller when said push member is actuated by said terminal bar member, in all those rotary positions of the flange in which said aperture is not disposed in the line of movement of said detent projection, and wherein the edge of one of said detent projection and said aperture in said flange, which comes to bear against an edge of the other of said detent projection and said aperture in the unwinding direction of rotation of said roller has an inclined surface means in the peripheral direction, to permit rotary movement in the opposite direction to the winding-in direction of said roller.

4. A projection screen arrangement as set forth in claim 3 wherein said detent projection is radially bevelled at its free end thereby to permit said detent projection to move past the side of the flange remote from the roller when the push member is actuated by the terminal bear member in any rotary position of the flange in which said aperture in the flange is not in line with the detent projection.

5. A projection screen arrangement as set forth in claim 4 wherein said detent projection is bevelled in the peripheral direction at the edge thereof which comes into contact with an edge of said aperture in the unwinding direction of rotation of said roller.

6. A projection screen arrangement as set forth in claim 1 and comprising a slide member guided for radial displacement at the inside of the end of said housing at which said rotary actuating member is disposed on the outside thereof, said slide member having a first end providing said push member and a second end forming a leg adapted to be engaged by the spring means urging the push member into the unactuated position, said detent member being a detent projection provided on the slide member in the vicinity of said push member.

7. A projection screen arrangement as set forth in claim 1 and further including a latch means on the housing for securing the terminal bar member to the housing when the projection screen is in the wound-in condition.

* * * * *